United States Patent
Oriani

(10) Patent No.: US 6,599,982 B2
(45) Date of Patent: Jul. 29, 2003

(54) PROCESS AID FOR MELT PROCESSABLE POLYMERS

(75) Inventor: Steven Richard Oriani, Landenberg, PA (US)

(73) Assignee: DuPont Dow Elastomers L.L.C., Wilmington, DE (US)

( * ) Notice: Subject to any disclaimer, the term of this patent is extended or adjusted under 35 U.S.C. 154(b) by 0 days.

(21) Appl. No.: 10/008,518

(22) Filed: Nov. 8, 2001

(65) Prior Publication Data

US 2003/0100680 A1 May 29, 2003

(51) Int. Cl.[7] .............. C08L 9/00; C08L 23/00; C08L 23/04; C08L 27/12; C08L 47/00
(52) U.S. Cl. ............ 525/191; 525/199; 525/233; 525/239; 525/240
(58) Field of Search ................ 525/191, 199, 525/233, 239, 240

(56) References Cited

U.S. PATENT DOCUMENTS

| | | |
|---|---|---|
| 4,904,735 A | 2/1990 | Chapman, Jr. et al. |
| 5,106,911 A | 4/1992 | Chapman, Jr. et al. |
| 6,242,548 B1 | 6/2001 | Duchesne et al. |
| 6,277,919 B1 | 8/2001 | Dillon et al. |
| 6,323,283 B1 * | 11/2001 | Apostolo et al. ............ 525/199 |
| 2002/0161120 A1 * | 10/2002 | Chapman et al. ............ 525/165 |

FOREIGN PATENT DOCUMENTS

| | | |
|---|---|---|
| WO | WO 91/04842 A1 | 4/1991 |
| WO | WO 91/18056 A1 | 11/1991 |

* cited by examiner

Primary Examiner—Nathan M. Nutter

(57) ABSTRACT

Extrusion processability of non-fluorinated melt-processable polymers is improved by introducing a process aid package comprising at least two unimodal fluoroelastomers having different Mooney viscosities.

20 Claims, No Drawings

PROCESS AID FOR MELT PROCESSABLE POLYMERS

FIELD OF THE INVENTION

The present invention relates to extrusion of non-fluorinated melt-processable polymers which contain two or more unimodal fluoroelastomer processing aids of different Mooney viscosities.

BACKGROUND OF THE INVENTION

The melt extrusion of high molecular weight polymers, for example, hydrocarbon polymers and polyamides, into shaped structures such as tubing, pipe, wire coating or film is accomplished by well-known procedures wherein a rotating screw pushes a viscous polymer melt through an extruder barrel into a die in which the polymer is shaped to the desired form and is then subsequently cooled and solidified into a product having the general shape of the die.

In order to achieve low production costs, it is desirable to extrude the polymer at rapid rates. Higher extrusion rates may be readily obtained by increasing the rate of revolution of the extruder screw. However, this technique is subject to limitations imposed by the viscoelastic properties of the polymer substrate. Thus, at very high extrusion rates an unacceptable amount of thermal decomposition of the polymer can result. Further, extrudates having a rough surface are often obtained which can lead to formation of an undesirable pattern on the surface of the extrudate. Extrusion at elevated temperatures obviates this problem but adds to processing costs. Also, cooling of the extrudate becomes problematic. In addition, if polyolefins are extruded at temperatures near their decomposition points, polymer degradation occurs.

It is desirable, therefore, to find highly efficient means of increasing the extrusion rate without raising the melt temperature, while producing articles having smooth surfaces. Changes in extruder and die configuration can improve polymer melt flow, but these modifications are not always practical or economically feasible. Another approach involves the addition of conventional wax-type process aids which reduce bulk viscosity and in some cases improve processing properties. However, the efficiency is marginal and the high levels of additive required often adversely affect other properties.

In Blatz, U.S. Pat. No. 3,125,547, it is disclosed that the use of 0.01–2.0 wt. % of a fluorocarbon polymer that is in a fluid state at the process temperature, such as a fluoroelastomer, will reduce die pressure in extrusions of non-fluorinated polymers such as high and low density polyethylenes and other polyolefins. Further, use of this additive allows significant increase in extrusion rates without melt fracture.

More recently, improved fluoropolymer process aid compositions have been disclosed in for example, U.S. Patent Nos. 4,855,360; 5,587,429 and 5,707,569. In these fluoropolymer process aid compositions, a second additive, such as a poly(oxyalkylene) or an ionomer resin, is introduced in order to improve extrusion processability of the non-fluorinated polymer.

Various processing aids that are blends of two or more elastomeric or thermoplastic fluoropolymers have been described in the prior art. U.S. Pat. No. 4,904,735 discloses blends of a tetrafluoroethylene homo- or copolymer (which is a solid at the extrusion temperature) with either a fluoroelastomer having a Tg less than the extrusion temperature, or a crystalline fluoropolymer having a melting point below the extrusion temperature. U.S. Pat. No. 5,106,911 discloses blends of a fluoroelastomer and a crystalline vinylidene fluoride homo- or copolymer wherein the latter has a melting point less than the extrusion temperature.

U.S. Pat. No. 6,242,548 B1 discloses process aids which are multimodal fluoroplastic terpolymers having a low, high and (optionally) an ultra-high molecular weight component. U.S. Pat. No. 6,277,919 B1 discloses process aids which are multimodal amorphous or semi-crystalline fluoropolymers having at least a low molecular weight component and a high molecular weight component. The latter process aids may optionally contain a poly(oxyalkylene) polymer. The multimodal fluoropolymers may be manufactured by a variety of means. For example, a step change may be made in reaction conditions part way through a polymerization (e.g. by addition of a chain transfer agent or by changing the reactor temperature). Another method for making multimodal polymers is by intimately mixing either latexes or powder products of the separate high and low molecular weight fluoropolymer components.

SUMMARY OF THE INVENTION

It has been surprisingly discovered that process aids which are unimodal blends of a high molecular weight fluoroelastomer and a low molecular weight fluoroelastomer are more efficient process aids than the prior art fluoropolymer process aids. By "more efficient" is meant that less conditioning time is required for an extruded article to be free of melt fracture when a unimodal fluoroelastomer blend process aid of this invention is included in the extrudable composition, rather than a bimodal fluoropolymer process aid.

Accordingly, one aspect of the present invention is an extrudable unimodal fluoroelastomer composition comprising:
A) 0.001 to 10 weight percent, based on total weight of the extrudable composition, of a first unimodal fluoroelastomer having a first Mooney viscosity ML(1+10) at 121° C.;
B) 0.001 to 10 weight percent, based on total weight of the extrudable composition, of a second unimodal fluoroelastomer having a second Mooney ML(1+10) at 121° C., said second Mooney viscosity being less than said first Mooney viscosity; and
C) a non-fluorinated melt processable polymer, wherein the difference between said first and second Mooney viscosities is at least 15.

Another aspect of the invention is an extrudable composition made by a process comprising mixing together simultaneously i) 0.001 to 10 weight percent, based on total weight of the extrudable composition, of a first fluoroelastomer having a first Mooney viscosity ML(1+10) at 121° C., ii) 0.001 to 10 weight percent, based on total weight of the extrudable composition, of a second fluoroelastomer having a second Mooney ML(1+10) at 121° C., and iii) a non-fluorinated melt processable polymer, wherein the difference between said first and second Mooney viscosities is at least 15.

Another aspect of the invention is an extrudable composition made by a process comprising:
A) mixing 0.001 to 10 weight percent, based on total weight of the extrudable composition, of a first fluoroelastomer with a non-fluorinated melt processable polymer to form a pre-composition, wherein said first fluoroelastomer has a first Mooney viscosity ML(1+10) at 121° C.;

B) mixing 0.001 to 10 weight percent, based on total weight of the extrudable composition, of a second fluoroelastomer into said pre-composition to form an extrudable composition, wherein said second fluoroelastomer has a second Mooney viscosity ML(1+10) at 121° C., and wherein the difference between said first and second Mooney viscosities is at least 15.

Another aspect of the invention is an extrudable composition made by a process comprising mixing A) a first pre-composition comprising i) a first fluoroelastomer having a first Mooney viscosity ML(1+10) at 121° C. and ii) a non-fluorinated melt processable polymer, with B) a second pre-composition comprising i) a second fluoroelastomer having a second Mooney viscosity ML(1+10) at 121° C. and ii) a non-fluorinated melt processable polymer to form an extrudable composition comprising 0.001 to 10 weight percent, based on total weight of the extrudable composition, of said first fluoroelastomer and 0.001 to 10 weight percent, based on total weight of the extrudable composition, of said second fluoroelastomer, and wherein the difference between said first and second Mooney viscosities is at least 15.

DETAILED DESCRIPTION OF THE INVENTION

The present invention is directed to means for improving the extrusion processability of non-fluorinated melt processable polymer compositions. The term "extrusion processability" as used herein refers to the conditioning time (i.e. the elapsed time between extruder start up when extruded articles exhibit a high degree of melt fracture and the time when an extrudate has a smooth surface, free of melt fracture). Obviously, in order to minimize waste and reduce costs, a very short conditioning time is desirable.

Examples of non-fluorinated melt processable polymers include, but are not limited to, hydrocarbon resins, polyamides, chlorinated polyethylene, polyvinyl chloride, and polyesters. By the term "non-fluorinated" it is meant that the ratio of fluorine atoms (if any) to carbon atoms present in the polymer is less than 1:1. The non-fluorinated melt-processable polymers of this invention may be selected from a variety of polymer types. Such polymers include hydrocarbon polymers having melt indexes (measured according to ASTM D1238 at 190° C., using a 2160 g weight) of 5.0 g/10 minutes or less, preferably 2.0 g/10 minutes or less. The hydrocarbon polymers may be elastomeric copolymers of ethylene, propylene, and optionally a non-conjugated diene monomer, for example 1,4-hexadiene. In general, hydrocarbon polymers also include any thermoplastic hydrocarbon polymer obtained by the homopolymerization or copolymerization of a monoolefin of the formula $CH_2=CHR$, where R is H or an alkyl radical, usually of not more than eight carbon atoms. In particular, this invention is applicable to polyethylene, of both high density and low density, for example, polyethylenes having a density within the range 0.89 to 0.97 $g/cm^3$; polypropylene; polybutene-1; poly(3-methylbutene); poly(methylpentene); and linear low density copolymers of ethylene and alpha-olefins such as propylene, butene-1, hexene-1, octene-1, decene-1, and octadecene. Hydrocarbon polymers may also include vinyl aromatic polymers such as polystyrene. Because specific hydrocarbon polymers exhibit differing melt characteristics, the practice of this invention may have greater utility in some hydrocarbon polymers than in others. Thus, hydrocarbon polymers such as polypropylene and branched polyethylene that are not of high molecular weight have favorable melt flow characteristics even at lower temperatures, so that surface roughness and other surface defects can be avoided by adjustment of extrusion conditions. These hydrocarbon polymers may only require the use of the fluorocarbon polymer extrusion aids and process of this invention under unusual and exacting extrusion conditions. However, other polymers such as high molecular weight, high density polyethylene, linear low density polyethylene copolymers, high molecular weight polypropylene, and propylene copolymers with other olefins, particularly those with narrow molecular weight distributions, do not permit this degree of freedom in variation of extrusion conditions. It is particularly with these resins that improvements in the surface quality of the extruded product are obtained with the compositions and process of this invention.

Other non-fluorinated melt-processable polymers of this invention include polyamides and polyesters. Specific examples of polyamides useful in the practice of this invention are nylon 6, nylon 6/6, nylon 6/10, nylon 11 and nylon 12. Suitable polyesters include poly(ethylene terephthalate) and poly(butylene terephthalate).

The fluoropolymer components useful in this invention are elastomeric fluoropolymers (i.e. fluoroelastomers). Fluoroelastomers useful in this invention are fluoropolymers that are normally in the fluid state at room temperature and above, i.e. fluoropolymers which have values of $T_g$ below room temperature and which exhibit little or no crystallinity at room temperature. It is preferred, but not essential, to employ fluoroelastomers having a fluorine to hydrogen ratio of at least 1:1.5. Fluorinated monomers which may be copolymerized to yield suitable fluoroelastomers include vinylidene fluoride, hexafluoropropylene, chlorotrifluoroethylene, tetrafluoroethylene and perfluoroalkyl perfluorovinyl ethers. Specific examples of the fluoroelastomers which may be employed include copolymers of vinylidene fluoride and a comonomer selected from hexafluoropropylene, chlorotrifluoroethylene, 1-hydropentafluoropropylene, and 2-hydropentafluoropropylene; copolymers of vinylidene fluoride, tetrafluoroethylene, and hexafluoropropylene or 1- or 2-hydropentafluoropropylene; and copolymers of tetrafluoroethylene, propylene and, optionally, vinylidene fluoride, all of which are known in the art. In some cases these copolymers may also include bromine-containing comonomers as taught in Apotheker and Krusic, U.S. Pat. No. 4,035,565, or terminal iodo-groups, as taught in U.S. Pat. No. 4,243,770. The latter patent also discloses the use of iodo group-containing fluoroolefin comonomers. When fluorinated monomers are present in these copolymers in certain molar ratios, the glass transition temperature of the polymer is near or below 0° C., and the compositions are useful elastomers that are readily available articles of commerce. Preferably the fluoroelastomers employed in the compositions of this invention contain copolymerized units of i) vinylidene fluoride/hexafluoropropylene; ii) vinylidene fluoride/hexafluoropropylene/tetrafluoroethylene; iii) tetrafluoroethylene/propylene; or iv) tetrafluoroethylene/propylene/vinylidene fluoride.

The extrudable compositions of this invention comprise at least two unimodal fluoroelastomers dispersed in a major amount of non-fluorinated melt processable polymer. The two fluoroelastomers may have the same composition of copolymerized monomer units, or they may be different. Mooney viscosity ML(1+10) at 121° C.) and the other has a relatively low molecular weight (or Mooney viscosity ML(1+10) at 121° C.). Preferably, the high molecular weight fluoroelastomer has a ML(1+10) at 121° C. greater than 50, more preferably greater than 60 and most preferably greater than 70. Preferably, the low molecular weight fluoroelastomer has a ML(1+10) at 121° C. less than 60, more preferably less than 45 and most preferably less than 35. However, the difference in Mooney viscosities between the high and low molecular weight fluoroelastomers is more critical than the absolute Mooney viscosity of either fluoroelastomer. The difference in Mooney viscosities must be at least 15 and preferably at least 25.

Each of the fluoroelastomers contained in the extrudable compositions of the invention are present in the range of 0.001 to 10 weight percent, based on the total weight of the extrudable composition. Typically, compositions which are to be shaped, without further dilution, into structures such as tubing, pipe, wire coating or film contain fluoroelastomers in the low end of this range such as 0.001 to 0.1 weight percent, whereas concentrated compositions, which will be diluted prior to shaping, contain 1 to 10 weight percent of each fluoroelastomer. Preferably, the weight ratio of the high Mooney fluoroelastomer to the low Mooney fluoroelastomer is at least 1:20, more preferably at least 1:10 and most preferably the weight ratio is in the range of 1:5 to 1:1.

Surprisingly, it has been discovered that the extrudable compositions of the invention (containing 2 or more unimodal fluoroelastomers) process better (i.e. exhibit less conditioning time) than extrudable compositions containing the same level of multimodal fluoroelastomers. By the term "multimodal fluoroelastomer composition" is meant a homogeneous mixture of at least two fluoroelastomers of different molecular weights, wherein the individual fluoroelastomer components cannot be separated or distinguished from each other except by techniques that fractionate the polymers on the basis of molecular weight, such as size exclusion chromatography. Multimodal compositions may be prepared by a number of methods such as by i) making a step change in polymerization conditions (e.g. reactor temperature, initiator level, or chain transfer agent level) during a polymerization, or ii) intimately mixing the latex or gum forms of a high and a low molecular weight fluoroelastomer.

The compositions of this invention are not made by a process that results in a multimodal fluoroelastomer composition. Instead the compositions of this invention may be made by a variety of processes in which the fluoroelastomers remain in a unimodal state. By the term "unimodal state" is meant that the fluoroelastomers are never present together as the major components in a homogeneous composition such as a melt blend. If present together as the major components of an intermediate composition employed to make the extrudable compositions of this invention, the fluoroelastomers may be distinguished from each other as separate components.

A process suitable for making the extrudable compositions of this invention is one in which the fluoroelastomers and non-fluorinated melt processable polymer are all mixed together simultaneously. Suitable mixers include an extruder, a compounding mill and an internal mixer (e.g. a Banbury).

Another process suitable for making the extrudable compositions of this invention is one in which one of the fluoroelastomers is first mixed with non-fluorinated melt processable polymer to form a pre-composition, and then the second fluoroelastomer is introduced and mixed with the pre-composition to form an extrudable composition of the invention.

Another process suitable for making the extrudable compositions of this invention is one in which two pre-compositions are first prepared, one pre-composition containing the first fluoroelastomer and non-fluorinated melt processable polymer, and the other pre-composition containing the second fluoroelastomer and non-fluorinated melt processable polymer. These two pre-compositions are then mixed to form an extrudable composition of the invention.

The extrudable compositions of this invention may, optionally, contain other ingredients such as, but not limited to fillers (e.g. carbon black, silicon dioxide and titanium dioxide), colorants, antioxidants, antiblocks and interfacial agents. These auxiliary ingredients may be added at any of the afore-mentioned compounding steps, up to and including the final melt shaping process. Preferably, ingredients that have a beneficial effect on process aid performance, such as interfacial agents, are added before the final dilution of fluoropolymer occurs in the final melt shaping process. Ingredients that have a deleterious effect on process aid performance (such as mineral particulates like silicon dioxide or talc) are most preferably added in the final melt shaping process, so as to minimize contact with the fluoroelastomer.

Examples of interfacial agents include, but are not limited to i) silicone-polyether copolymers; ii) aliphatic polyesters such as poly(butylene adipate), poly(lactic acid) and polycaprolactone polyesters; iii) aromatic polyesters such as phthalic acid diisobutyl ester; iv) polyether polyols such as poly(tetramethylene ether glycol); v) amine oxides such as octyidimethyl amine oxide; vi) carboxylic acids such as hydroxy-butanedioic acid; vii) fatty acid esters such as sorbitan monolaurate and triglycerides; and viii) poly (oxyalkylene) polymers. As used herein, the term "poly (oxyalkylene) polymers" refers to those polymers and their derivatives that are defined in U.S. Pat. No. 4,855,360. Such polymers is include polyethylene glycols and their derivatives (e.g. Carbowax™ PEG 8000 and Polyvox™ WSR N-10). A preferred aliphatic polyester interfacial agent is a polycaprolactone having a number average molecular weight in the range 1000 to 32000, preferably 2000 to 10000, and most preferably 2000 to 4000. When present, the weight ratio of interfacial agent to total fluoroelastomers in the extrudable compositions is typically between 5:1 to 1:2.

The processes and compositions of the invention are particularly useful in extrusions of melt processable polyolefins. Such extrusion processes are commonly used in manufacture of blown films and wire and cable jacketing.

EXAMPLES

The following examples illustrate the significant improvement in extrusion processability, as evidenced by lower conditioning times and lower gel levels, when the extrudable composition contains at least two unimodal fluoroelastomers of different molecular weight.

The materials employed in these examples were as follows:

The non-fluorinated melt processable polymer was a high molecular weight linear low density polyethylene, i.e. a linear low density (d=0.918 g/cc) copolymer of ethylene and 1-butene having a melt index (ASTM D-1238, condition E) of 1.0 (hereinafter referred to as "LLDPE").

The fluoroelastomers (FKM-1, FKM-2, or FKM-3) used in these examples were copolymers of vinylidene fluoride and hexafluoropropylene, having Mooney viscosities ML(1+10) at 121° C. (measured per ASTM D-1646, large rotor) as shown below:

| Fluoroelastomer | Mooney Viscosity |
|---|---|
| FKM-1 | 25 |
| FKM-2 | 55 |
| FKM-3 | 75 |

The interfacial agent employed was Carbowax™ PEG-8000, a polyethylene oxide having a number average molecular weight of 8000.

Example 1

Extrudable compositions of the invention (Samples 1–6) and comparative extrudable compositions (Samples A–F) were prepared by dry blending all the ingredients together simultaneously and melt mixing the composition using a 30 mm co-rotating twin screw extruder. The twin screw operated at a screw speed of 300 revolution per minute (rpm), and barrel set temperature of 200° C. The ingredients used are shown in Table 1 wherein the weight percent numbers are based on the total weight of the extrudable compositions. LLDPE was the diluent polymer making up the remainder of each composition.

The extrudable compositions prepared above were further diluted by admixture with LLDPE to yield extrudable compositions containing a total of 180 ppm fluoroelastomer and 144 ppm PEG-8000. Blown films 25 microns in thickness were produced from these compositions using a 2.5 inch (0.98 cm) 24:1 L/D extruder equipped with a 4 inch (1.58 cm) blown film die having a 0.030 inch (0.12 mm) gap. Barrel zone temperatures (starting at the feed section) were 160° C., 180° C., 194° C., and 190° C., with adapter and die temperatures of 200° C. Melt temperature for each run was 212° to 214° C., and the die pressure at the start of each run was in the range of 27.7 to 28.3 MPa. The screw was a conventional design with a barrier flight, operating at 40 rpm. Extruder output at the start of each run was 45.4 kg/hour, resulting in apparent shear rates in the die gap of approximately 500 sec$^{-1}$.

Prior to each test run, the extruder and die were purged with a masterbatch containing 50% silica (diatomaceous earth) in order to remove the fluoroelastomer from the previous test. After purging the silica masterbatch from the extruder with LLDPE, blown film was produced using 100% LLDPE for 10 minutes to ensure that each test began with 100% melt fracture.

When the extrudable composition being tested dropped into the feed throat of the extruder, a digital timer with a one second readout was started. The melt fracture removal performance of each extrudable composition was monitored by continuous visual observation of the roughness of the melt exiting the die and of the blown film. When no melt fracture was visible in this manner, the digital timer was stopped, and a film sample was taken for inspection to ensure that the melt fracture was completely eliminated. If the melt fracture was completely removed, the conditioning time was recorded as the time registering on the digital timer. When melt fracture was still present after 60 minutes of running time, a film sample was taken, and the test was terminated.

The film samples taken were evaluated for gel content by visually examining a single layer of the film of size 15 by 15 cm, and comparing the quantity of gels visible with the naked eye to film standards. These film standards were rated on a scale from 1 to 5, on which a film with a gel rating of "1" contained no visible gels, while a film with a gel rating of "5" contained a high level of gels.

The results of these tests are shown in Table 1. Several trends are seen in the data. Conditioning times generally improved (i.e. decreased) as the total level of fluoroelastomer in the undiluted compositions (Samples 1–6) increased, even though the relative levels of fluoroelastomer and PEG were constant for all-melt fracture tests. The high Mooney viscosity FKM-3 fluoroelastomer was more effective at decreasing the conditioning time than the moderate Mooney viscosity FKM-2, and the latter was more effective than the low Mooney viscosity FKM-1. However, the high Mooney viscosity FKM-3 caused a large number of gel defects in the film. The addition of a lower Mooney viscosity fluoroelastomer to compositions containing FKM-3 lowered the gel content, without greatly increasing the conditioning time. Compositions containing approximately 50/50 weight ratio FKM-3/FKM-2 (i.e. Samples 1 and 3) or 50/50 FKM-3/FKM-1 (Samples 5 and 6) offered the best compromise of conditioning time and gel level.

TABLE 1

| Extrudable Composition | FKM-1 wt % | FKM-2 wt % | FKM-3 wt % | PEG-8000 wt % | Conditioning time (min) | Gel ration (1–5) |
|---|---|---|---|---|---|---|
| Sample 1 | 0 | 1 | 1 | 1.6 | 22 | 2 |
| Sample 2 | 0 | 1.5 | 0.5 | 1.6 | 41 | 1.5 |
| Sample 3 | 0 | 2 | 2 | 3.2 | 17 | 2.5 |
| Sample 4 | 0 | 3 | 1 | 3.2 | 24 | 2 |
| Sample 5 | 1 | 0 | 1 | 1.6 | 33 | 2 |
| Sample 6 | 2 | 0 | 2 | 3.2 | 21 | 2.5 |
| Comparative Sample A | 0 | 0 | 2 | 1.6 | 25 | 3 |
| Comparative Sample B | 0 | 0 | 4 | 3.2 | 28 | 4.5 |
| Comparative Sample C | 0 | 2 | 0 | 1.6 | 36 | 1.5 |
| Comparative Sample D | 0 | 4 | 0 | 3.2 | 40 | 1.5 |
| Comparative Sample E | 2 | 0 | 0 | 1.6 | >60 | 1.5 |
| Comparative Sample F | 4 | 0 | 0 | 3.2 | >60 | 1.5 |

Example 2

The surprising ability of extrudable compositions of this invention (containing unimodal fluoroelastomers) to improve conditioning time vs. comparative compositions (containing multimodal fluoroelastomers) was determined in this example.

An extrudable composition containing multimodal fluoroelastomer was made by first intimately mixing 50 wt. % FKM-3 with 50 wt. % FKM-2 on a 30 mm twin screw extruder operating at 300 rpm and having a temperature profile of 140° C., 160° C., 160° C. and 160° C. in the zones between the feed zone to die. Comparative Sample G was then produced by compounding 2% of this multimodal fluoroelastomer mixture into 1.6 wt. % Carbowax™ PEG-8000 and 96.4 wt. % LLDPE, using a twin screw extruder as described in Example 1. Similarly, Comparative Sample H was produced by compounding 4% of this multi-modal fluoroelastomer mixture with 3.2 wt. % Carbowax™ PEG-8000 and 92.8 wt. % LLDPE.

The multimodal comparative extrudable compositions prepared above were then let down in LLDPE to yield compositions containing a total of 180 ppm fluoroelastomer and 144 ppm PEG-8000. Conditioning times of these diluted multimodal compositions were compared to those of diluted unimodal compositions of the invention prepared from Samples 1 and 3 of Example 1 by the same procedure as that described in Example 1.

The conditioning time resulting from Sample 1 was 22 min., whereas the conditioning time resulting from Comparative Sample G was 51 minutes. The ingredients and their amounts were identical in Sample 1 and Comparative Sample G. Thus, the difference in conditioning time must have been due to the unimodal fluoroelastomers of Sample 1 versus the multimodal fluoroelastomers of Comparative Sample G.

The same surprising results were seen in the comparison of conditioning times resulting from unimodal Sample 3 and multimodal Comparative Sample H, 17 min. and 49 minutes, respectively. Both of the latter compositions had the same level of ingredients.

What is claimed is:

1. An extrudable unimodal fluoroelastomer composition comprising:
   A) 0.001 to 10 weight percent, based on total weight of the extrudable composition, of a first unimodal fluoroelastomer having a first Mooney viscosity ML(1+10) at 121° C.;
   B) 0.001 to 10 weight percent, based on total weight of the extrudable composition, of a second unimodal fluoroelastomer having a second Mooney ML(1+10) at 121° C., said second Mooney viscosity being less than said first Mooney viscosity; and
   C) a non-fluorinated melt processable polymer, wherein the difference between said first and second Mooney viscosities is at least 15.

2. The composition of claim 1 wherein the difference between said first and second Mooney viscosities is at least 25.

3. The composition of claim 1 wherein the weight ratio of said first fluoroelastomer to said second fluoroelastomer is at least 1:20.

4. The composition of claim 3 wherein the weight ratio of said first fluoroelastomer to said second fluoroelastomer is at least 1:10.

5. The composition of claim 4 wherein the weight ratio of said first fluoroelastomer to said second fluoroelastomer is in the range of 1:5 to 1:1.

6. The composition of claim 1 wherein said first and second fluoroelastomers comprise copolymerized units selected from the group consisting of i) vinylidene fluoride/hexafluoropropylene; ii) vinylidene fluoride/hexafluoropropylene/tetrafluoroethylene; iii) tetrafluoroethylene/propylene; and iv) tetrafluoroethylene/propylene/vinylidene fluoride.

7. The composition of claim 1 wherein said non-fluorinated melt processable polymer is selected from the group consisting of i) high molecular weight, high density polyethylene; ii) linear low density polyethylene copolymers; iii) high molecular weight polypropylene; iv) high molecular weight polypropylene; and v) copolymers of propylene with other olefins.

8. The composition of claim 1 further comprising an interfacial agent selected from the group consisting of i) silicone-polyether copolymers; ii) aliphatic polyesters; iii) aromatic polyesters; iv) polyether polyols; v) amine oxides; vi) carboxylic acids; vii) fatty acid esters; and viii) poly (oxyalkylene) polymers.

9. An extrudable composition made by a process comprising mixing together simultaneously i) 0.001 to 10 weight percent, based on total weight of the extrudable composition, of a first fluoroelastomer having a first Mooney viscosity ML(1+10) at 121° C., ii) 0.001 to 10 weight percent, based on total weight of the extrudable composition, of a second fluoroelastomer having a second Mooney ML(1+10) at 121° C., and iii) a non-fluorinated melt processable polymer, wherein the difference between said first and second Mooney viscosities is at least 15.

10. The composition of claim 9 wherein the difference between said first and second Mooney viscosities is at least 25.

11. The composition of claim 9 wherein said first and second fluoroelastomers comprise copolymerized units selected from the group consisting of i) vinylidene fluoride/hexafluoropropylene; ii) vinylidene fluoride/hexafluoropropylene/tetrafluoroethylene; iii) tetrafluoroethylene/propylene; and iv) tetrafluoroethylene/propylene/vinylidene fluoride.

12. The composition of claim 9 wherein said non-fluorinated melt processable polymer is selected from the group consisting of i) high molecular weight, high density polyethylene; ii) linear low density polyethylene copolymers; iii) high molecular weight polypropylene; iv) high molecular weight polypropylene; and v) copolymers of propylene with other olefins.

13. An extrudable composition made by a process comprising:
   A) mixing 0.001 to 10 weight percent, based on total weight of the extrudable composition, of a first fluoroelastomer with a non-fluorinated melt processable polymer to form a pre-composition, wherein said first fluoroelastomer has a first Mooney viscosity ML(1+10) at 121° C.;
   B) mixing 0.001 to 10 weight percent, based on total weight of the extrudable composition, of a second fluoroelastomer into said pre-composition to form an extrudable composition, wherein said second fluoroelastomer has a second Mooney viscosity ML(1+10) at 121° C., and wherein the difference between said first and second Mooney viscosities is at least 15.

14. The composition of claim 13 wherein the difference between said first and second Mooney viscosities is at least 25.

15. The composition of claim 13 wherein said first and second fluoroelastomers comprise copolymerized units selected from the group consisting of i) vinylidene fluoride/hexafluoropropylene; ii) vinylidene fluoride/hexafluoropropylene/tetrafluoroethylene; iii) tetrafluoroethylene/propylene; and iv) tetrafluoroethylene/propylene/vinylidene fluoride.

16. The composition of claim 13 wherein said non-fluorinated melt processable polymer is selected from the group consisting of i) high molecular weight, high density polyethylene; ii) linear low density polyethylene copolymers; iii) high molecular weight polypropylene; iv) high molecular weight polypropylene; and v) copolymers of propylene with other olefins.

17. An extrudable composition made by a process comprising mixing A) a first pre-composition comprising i) a first fluoroelastomer having a first Mooney viscosity ML(1+10) at 121° C. and ii) a non-fluorinated melt processable polymer, with B) a second pre-composition comprising i) a second fluoroelastomer having a second Mooney viscosity ML(1+10) at 121° C. and ii) a non-fluorinated melt processable polymer to form an extrudable composition comprising 0.001 to 10 weight percent, based on total weight of the extrudable composition, of said first fluoroelastomer and 0.001 to 10 weight percent, based on total weight of the extrudable composition, of said second fluoroelastomer, and wherein the difference between said first and second Mooney viscosities is at least 15.

18. The composition of claim 17 wherein the difference between said first and second Mooney viscosities is at least 25.

19. The composition of claim 17 wherein said first and second fluoroelastomers comprise copolymerized units selected from the group consisting of i) vinylidene fluoride/hexafluoropropylene; ii) vinylidene fluoride/hexafluoropropylene/tetrafluoroethylene; iii) tetrafluoroethylene/propylene; and iv) tetrafluoroethylene/propylene/vinylidene fluoride.

20. The composition of claim 17 wherein said non-fluorinated melt processable polymer is selected from the group consisting of i) high molecular weight, high density polyethylene; ii) linear low density polyethylene copolymers; iii) high molecular weight polypropylene; iv) high molecular weight polypropylene; and v) copolymers of propylene with other olefins.

* * * * *